April 19, 1949.    F. W. GODSEY, JR    2,467,738
STRAIN RESPONSIVE DEVICE
Filed Aug. 30, 1946
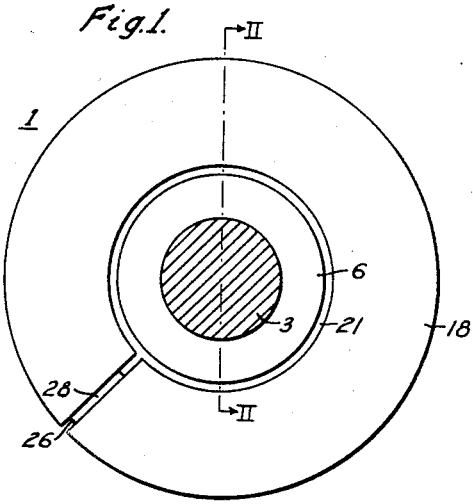
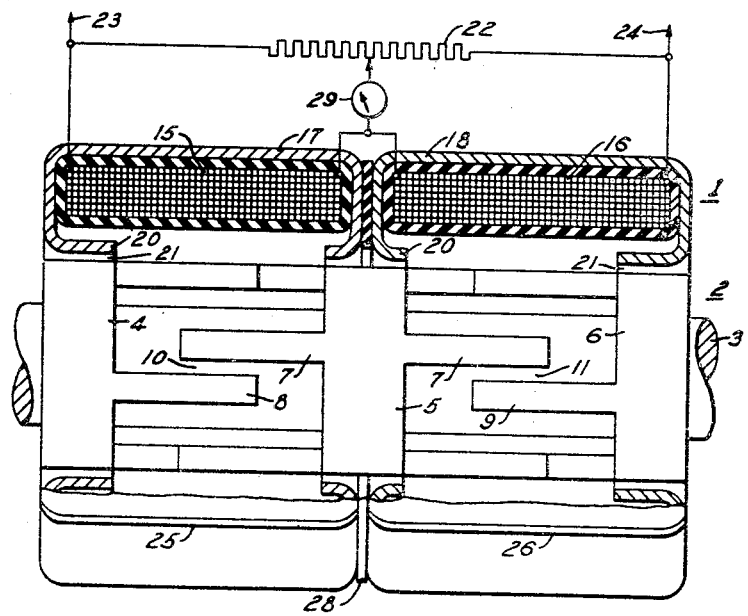
WITNESSES:
INVENTOR
Frank W. Godsey, Jr.
BY
Paul E. Friedemann
ATTORNEY Patented Apr. 19, 1949

2,467,738

UNITED STATES PATENT OFFICE 2,467,738

STRAIN RESPONSIVE DEVICE

Frank W. Godsey, Jr., Pittsburgh, Pa., assignor to Westinghouse Electric Corporation, East Pittsburgh, Pa., a corporation of Pennsylvania Application August 30, 1946, Serial No. 694,068

2 Claims. (Cl. 73—136)

This invention relates generally to electromagnetic devices and more specifically to devices of this type adaptable for use as the strain responsive elements in strain measuring systems.

More in particular this invention is related to a torque measuring device of the electromagnetic type which utilizes the strain of the test specimen resulting from torque application thereto, to produce an electrical quantity or electrical change, in dependence of the strain, indicative of the torque loading of the test specimen.

In certain of its aspects this invention is related to a copending application of F. W. Godsey, Jr., Serial No. 455,258, filed August 18, 1942 and entitled Power measuring device for rotating shafts, now abandoned.

In certain other of its aspects this invention is related to a copending application of B. F. Langer and F. W. Godsey, Jr., Serial No. 458,378, filed September 15, 1942 and entitled Torque measuring devices for shafts, now Patent No. 2,459,171, both of these applications being assigned to the same assignee as this invention.

Considerable effort has been expended in the past in the development of practical torque and power measuring devices for ascertaining with reasonable accuracy the torque or power being transmitted by a rotatable shaft. These efforts have resulted in a device, hereinafter specifically described, involving a variable reluctance rotor secured to the shaft, the magnetic reluctance being variable in dependence of the torque of the rotatable shaft, and a stationary electromagnetic flux producing unit, the flux of which links the rotor and is varied by changes in rotor reluctance. Upon the occurrence of strain in the torque transmitting shaft the rotor reluctance varies and the flux linkage of the rotor and stationary unit changes in substantially proportional amount causing an electrical change in the stationary unit indicative of the shaft torque.

Test data accumulated both from laboratory and commercial applications of the torque measuring device indicates the principles embodied in the present device are sound and that the device when viewed in the light of past attempts is a practical success. However, it has been found that improvements in the electrical characteristics of the torque measuring device could be obtained and it is to features accomplishing this end that the present invention is directed.

One broad object of this invention is to improve the overall efficiency of an electromagnetic device of the class described.

Another object of this invention is to minimize electrical interference among the component parts of an electromagnetic device of the general class described.

It is a specific object of this invention in a device of the class described, to minimize eddy current losses and to minimize other unwanted electrical effects.

The foregoing statements are merely illustrative of the various aims and objects of this invention. Other objects and advantages will become apparent upon a study of the following specification when considered in conjunction with the accompanying drawing, in which:

Fig. 1 is an end view of a torque measuring device embodying the principles of this invention; and Fig. 2 is a longitudinal fragmentary sectional view taken on the line II—II of Fig. 1.

Referring now to Figs. 1 and 2 of the drawing and more particularly to Fig. 2, the torque measuring device therein illustrated includes the stationary annular electromagnetic unit generally denoted by 1 and the magnetizable rotor assembly generally denoted by 2.

The rotor assembly 2 is supported or secured to a shaft section 3 which may be any suitable shaft of a power transmitting installation and comprises the three shaft rings 4, 5 and 6 non-magnetically secured in spaced relation along the shaft so that known shaft gauge lengths are included therebetween. The central or reference ring 5 supports axially extending fingers or teeth 7 on each side thereof which interlock with or overlap the fingers or teeth 8 and 9 respectively supported by shaft rings 4 and 6, so that small circumferential airgaps 10 and 11 are formed therebetween. By way of example only, these circumferential airgaps may be of the order of 0.005 inch but are shown larger as a matter of drawing convenience. The arrangement of the airgaps 10 and 11 is such that upon transmission of torque from left to right of the shaft in a clockwise direction as viewed in the drawing the airgaps 10 will increase in length while the airgaps 11 will decrease in length. As a consequence the reluctance of the two rotor sections formed by the reference ring 5 changes from a condition of reluctance balance at zero shaft torque to a condition of unbalanced reluctance in dependence of the magnitude of shaft torque. For the assumed direction of torque transmission and the specific rotor construction, the reluctance between reference ring 5 and left ring 4 is increased, since the airgaps 10 increase, while the reluctance between reference ring 5 and right ring 6 is decreased by reason of the reduction in length of the airgaps 11. The departure from a condition of reluctance equilibrium of the two rotor sections is in opposite directions, resulting in an overall higher sensitivity to torque than either rotor section alone could provide, other things being equal.

The stationary electromagnetic unit 1 comprises two annular windings 15 and 16 concentrically arranged about the two rotor sections and each of which is housed in an incomplete annular magnetic shell respectively designated 17 and 18. Each of the magnetic shells is provided with inwardly flanged portions 20 concentrically arranged about the smooth peripheries of shaft rings 4, 5 and 6 so that small radial airgaps 21 are formed therebetween across which the magnetic flux may link the stationary and rotating elements of the torque measuring device. Windings 15 and 16 form adjacent legs of a conventional bridge circuit, the other two legs of which are comprised of the opposite portions of a potentiometer 22 as determined by the setting of the adjustable tap. An indicating instrument 29 such as a voltmeter is connected to a point between the windings 15 and 16 and the adjustable tap to measure bridge output, while input terminals 23 and 24 of the bridge circuit are connected to a suitable source of alternating current indicated by the sinusoidal wave therebetween. In one preferred operating procedure the bridge is balanced for zero shaft torque by adjustment of the variable tap along the potentiometer until a zero reading of the instrument 29 is obtained.

In general the operation of the torque measuring device is as follows:

Upon energization of the windings 15 and 16 with alternating current, fluxes associated with each winding flow in the respective housings and link the rotor across the radial airgaps. In the rotor this flux circulates between the respective rings 4 and 6 and reference ring 5 through the associated fingers or teeth and circumferential airgaps. When the shaft is unstrained the reluctances of the two rotor sections theoretically balance and the indicating instrument stands at zero. However when the shaft is under torsional strain as previously described the reluctances of the two rotor sections change in opposite directions due to opposite changes in the circumferential airgaps, the reluctance of the left rotor section as viewed increasing and the reluctance of the right section decreasing. As a consequence the flux linking winding 15 decreases while that linking winding 16 increases producing opposite impedance changes in the windings and correspondingly unbalancing the bridge circuit. The unbalanced voltage is indicated by the instrument 29 which may be calibrated in ft.-lbs. to give a direct reading of torque.

Since the respective housings 17 and 18 for the windings are incomplete annuli, airgaps 25 and 26 are respectively formed therein. The housings are formed in this manner to minimize eddy current losses in operation. When the magnetic circuits are balanced, the winding voltages are balanced and, hence, the voltages across the housing airgaps 25 and 26 are the same. However, when the shaft is twisted, one winding has a different voltage than the other and the voltages appearing across the airgaps 25 and 26 are different. For this reason it has been found desirable to electrically isolate the housings, not only from the surrounding frame structure (not shown) which may be utilized to support the housings but also to electrically insulate the housings from each other. If the housings are not electrically insulated an undesirable and uncertain short-circuit condition exists. Thus it is desirable that the two housings are electrically separated. This may be accomplished by disposing an insulating washer 28 between housing sections. The result is an improvement in the overall efficiency and accuracy of the torque measuring device.

The foregoing disclosure and the showings made in the drawing are merely illustrative of the principles of this invention and are not to be considered in a limiting sense. The only limitations are to be determined from the scope of the appended claims.

I claim as my invention:

1. In a strain measuring device, the combination of, a magnetizable rotor having two sections of oppositely variable reluctance, the reluctances of which are varied in dependence of a strain to be measured, an annular stationary winding concentrically arranged with each of the rotor sections for producing a magnetic flux linking the associated rotor section when the windings are energized with alternating current, a magnetic housing for each of the windings, each housing being of the form of an incomplete annulus so that a small airgap is formed between the confronting extremities of each of the housings, said housing and coil assemblies being coaxially arranged, said housings being electrically insulated one from the other.

2. In a strain measuring device, the combination of, a magnetizable rotor having two axially disposed sections of oppositely variable reluctance, the reluctances of which are varied in dependence of a strain to be measured, an annular stationary winding concentrically arranged with each of the rotor sections for producing a magnetic flux linking the associated rotor section when energized with alternating current, a magnetic housing for each of the windings, each housing being of the form of an incomplete annulus and enclosing the associated winding except for the winding surface adjacent said rotor, said windings and housings being axially disposed in conformance with the axial arrangement of the rotor sections, and means for electrically insulating said housings from each other.

FRANK W. GODSEY, Jr.

REFERENCES CITED

The following references are of record in the file of this patent:

UNITED STATES PATENTS

| Number | Name | Date |
| --- | --- | --- |
| 2,365,565 | Langer | Dec. 19, 1944 |
| 2,399,343 | Godsey | Apr. 30, 1946 |
| 2,415,513 | Martin et al. | Feb. 11, 1947 |